A. D. Waymoth,
Turning Regular Forms.
Nº 15,446. Patented July 29, 1856.
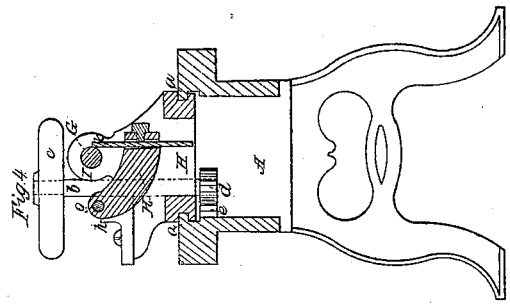
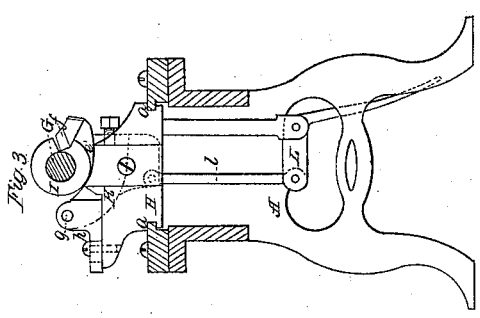
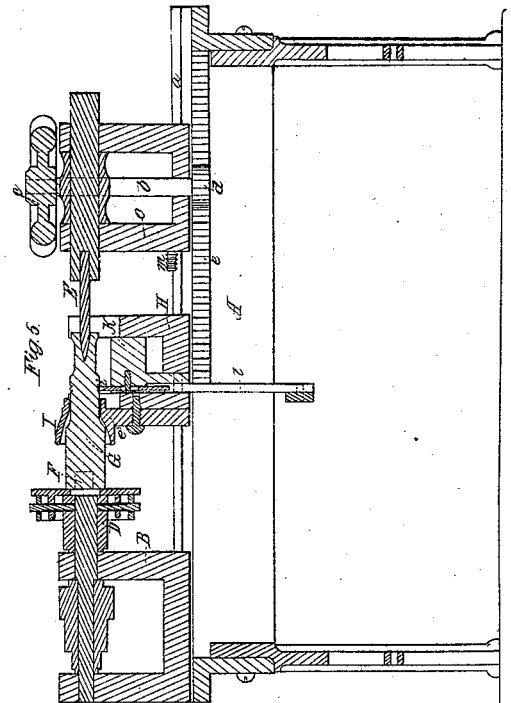
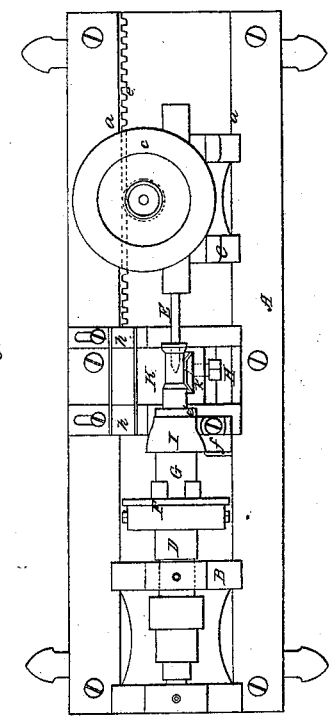
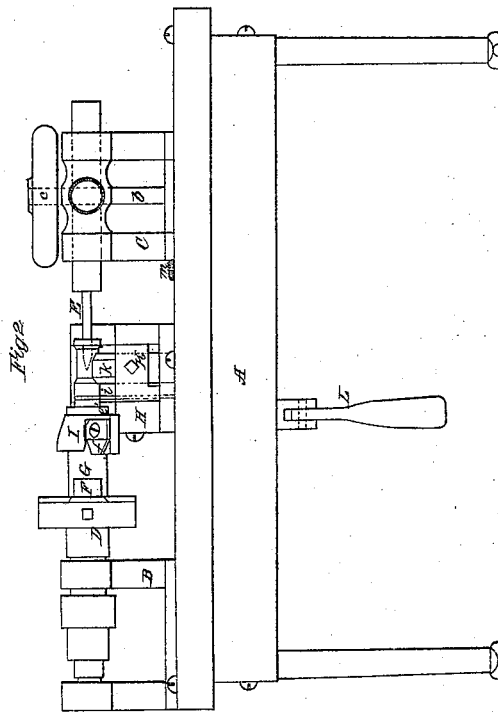

UNITED STATES PATENT OFFICE.

A. D. WAYMOTH, OF FITCHBURG, MASSACHUSETTS.

MACHINE FOR MANUFACTURING SPOOLS.

Specification of Letters Patent No. 15,446, dated July 29, 1856.

*To all whom it may concern:*

Be it known that I, AUGUSTINE D. WAYMOTH, of Fitchburg, in the county of Worcester and State of Massachusetts, have invented an Improved Machine for Making Spools; and I do hereby declare that the same is fully described and represented in the following specification and the accompanying drawings, of which—

Figure 1, exhibits a top view of the said machine; Fig. 2, a front elevation of it; Fig. 3, a transverse section between its chuck and rounding cutter. Fig. 4, is a transverse section taken through the body cutter to be hereinafter described. Fig. 5, is a longitudinal, central and vertical section.

In these drawings A, represents a frame made essentially like that of a common turning lathe and to support two puppet heads B, C, the former of which, viz, B, carries a revolving mandrel, D, while the latter which slides longitudinally toward and away from the former supports a drill or boring tool, E, as seen in the drawings. The puppet head B is stationary or fixed firmly to the frame A.

In order to move the boring carriage or puppet head C, on its parallel rails or ways $a$, $a$, there is applied to said carriage, a vertical shaft, $b$, carrying a hand wheel, $c$, on its upper end, and a pinion, $d$, on its lower end (see Fig. 1, 3, and 5) such pinion being caused to engage with a toothed rack, $e$, arranged as shown in Figs. 1 and 5. On the inner end of the mandrel D, is a chuck, F, for holding one end of the piece of wood, G, from which the spools are to be turned or constructed.

Between the two puppet heads, and so applied to the ways $a$, $a$, as to be capable of sliding thereon, like the puppet head, C, and either toward or away from the chuck, F, is a tool carriage, H, from which projects upward a socket head, I, of a rounding cutter, $f$, the same being disposed and formed as seen in the drawings. The head is made trumpet shaped or with a flaring or tapering mouth, $s$, for the reception and guidance of the piece of wood to be turned, said mouth terminating in a tubular rest $e'$, of the diameter of the cylinder to which the piece of wood is to be reduced by the action of the rounding cutter, $f$. Within the tool carriage, H, is a turning arm or tool holder K, which is arranged nearly horizontal in said carriage and has journals, $g$, $g$, near one end of it which are supported in bearings $h$, $h$, affixed to the tool carriage H, in the position as shown in Figs. 1, and 3, the said part, K, being a vibrating arm which turns on its journals and has the body and severing cutters $i$, $k$, arranged so as to project upward from it as shown in the drawings. The said vibrating tool holder is connected to a bent lever, L, by means of a connecting link or pitman, $l$, jointed to both; the said lever and pitman being disposed as shown in Figs. 2, 3, and 4. The front or longer arm of the lever, L, is arranged so as to be in a convenient position to enable the attendant on the machine by pressing his knee against it (the said arm) to so move the lever as to raise upward the vibrating tool holder, K, when necessary. The body cutter is disposed so as to stand nearly vertical and be capable of performing its work before the severing cutter is raised up into contact with the stick in order to separate therefrom the spool which may have been formed, the peculiar arrangement of the body cutter causing it to stand tangentially to the finished work whereby after it performs its office of turning the stick down so as to form the body and inner surface of the heads of the spool it may pass by them so as to permit the severing cutter by the further elevation of the tool holder, K, to perform its function of separating the spool from the stock.

A screw pin $m$, is made to project from the inner surface of the movable puppet head, C, as seen in Fig. 5, its object being to enable the puppet to move the tool carriage, H, forward under the stick so as to produce the rounding of the latter at the same time that it may be bored by the operation of the drill E, which having been accomplished, the puppet head, C, is moved backward so as to draw the drill entirely out of the work and prepare the rounded part of the stick to be reduced by the action of the body cutter, and subsequently to be separated by that of the severing cutter, these operations being effected in manner as above set forth.

In many other machines for making spools, the cutter carriage is not moved conjointly with and by the boring tool carriage as it is in my machine wherein such a feature affords an important advantage in operating with the machine, as will be readily understood by persons practically skilled in the use of machines for turning spools or other like articles. Besides the above, there results an advantage from the peculiar manner in which the body and severing cutters are arranged and applied to the carriage, H, and with respect to the common axis of the mandrel and the boring tool as by such, the body cutter is enabled to perform its work and pass out of action upon the stick and be moved simultaneously with the severing cutter, before said severing cutter shall have commenced to cut the stick—the upward movement of the body cutter continuing to take place, while the severing cutter is performing its offices. The mandrel is to be revolved by any proper means.

I do not claim combining one or more cutters with a sliding carriage made to slide horizontally and at right angles to the axis of the work to be turned, but

I claim—

1. Combining, the rounding, severing and body cutters, with a carriage made to slide between the chuck and boring carriage and in line with the latter, and so as to be moved toward the chuck by the boring carriage, while it is moved toward the work in manner as hereinbefore set forth.

2. I also claim arranging the body and severing cutters, and combining them with the cutter carriage by means of a turning holder, K, as above specified, whereby the said cutters may be made to operate, and be put in operation by means substantially as hereinbefore explained.

In testimony whereof, I have hereunto set my signature this seventeenth day of June A. D. 1856.

AUGUSTINE D. WAYMOTH.

Witnesses:
L. H. BRADFORD,
HALE W. PAGE.